(12) United States Patent
Lee et al.

(10) Patent No.: US 9,600,920 B2
(45) Date of Patent: Mar. 21, 2017

(54) METHOD AND APPARATUS FOR CREATING ANIMATION MESSAGE

(71) Applicant: Samsung Electronics Co., Ltd., Gyeonggi-do (KR)

(72) Inventors: Dong-Hyuk Lee, Seoul (KR); Mu-Sik Kwon, Seoul (KR); Sang-Wook Oh, Gyeonggi-do (KR); Do-Hyeon Kim, Gyeonggi-do (KR); Hee-Bum Ahn, Seoul (KR); Seong-Taek Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 359 days.

(21) Appl. No.: 13/886,933

(22) Filed: May 3, 2013

(65) Prior Publication Data

US 2013/0241936 A1 Sep. 19, 2013

Related U.S. Application Data

(62) Division of application No. 13/012,201, filed on Jan. 24, 2011, now Pat. No. 9,449,418.

(30) Foreign Application Priority Data

Jan. 22, 2010 (KR) .................. 10-2010-0006192
Mar. 29, 2010 (KR) .................. 10-2010-0028178

(51) Int. Cl.
*G06T 13/00* (2011.01)
*G06T 13/80* (2011.01)
*G06F 3/041* (2006.01)

(52) U.S. Cl.
CPC .............. *G06T 13/80* (2013.01); *G06F 3/041* (2013.01)

(58) Field of Classification Search
None
See application file for complete search history.

(56) References Cited

U.S. PATENT DOCUMENTS 5,014,198 A 5/1991 Umemura
5,903,669 A 5/1999 Hirabayashi
(Continued)

FOREIGN PATENT DOCUMENTS

CN 1538754 10/2004
EP 0374241 8/1997
(Continued)

OTHER PUBLICATIONS

Vaisey et al., "Variable Block-Size Image Coding", IEEE International Conference on Acoustics, Speech, and Signal Processing, ICASSP '87, vol. 12, pp. 1051-1054, 1987.
(Continued)

*Primary Examiner* — William Beutel
(74) *Attorney, Agent, or Firm* — The Farrell Law Firm, P.C.

(57) ABSTRACT

A method for creating an animation message includes generating input information containing information regarding input time and input coordinates according to input order of drawing information input through a touch screen; dividing an image containing the drawing information and background information into a plurality of blocks; creating an animation message by mapping the input information to the plurality of blocks so that the drawing information can be sequentially reproduced according to the input order; allocating a parity bit per pre-set block range of the animation message in order to detect an error occurring in the animation message; and transmitting the created animation message.

18 Claims, 14 Drawing Sheets

(56) References Cited

U.S. PATENT DOCUMENTS

| | | |
|---|---|---|
| 6,606,393 B1 | 8/2003 | Xie et al. |
| 6,718,064 B1 | 4/2004 | Abe |
| 7,050,637 B2 | 5/2006 | Akiyoshi et al. |
| 7,110,611 B2 | 9/2006 | Prosi |
| 7,134,064 B2 | 11/2006 | Kim |
| 7,302,107 B2 | 11/2007 | Ahmed et al. |
| 7,489,818 B2 | 2/2009 | Quick et al. |
| 7,536,623 B2 | 5/2009 | Kim et al. |
| 7,774,505 B2 | 8/2010 | Kang et al. |
| 7,873,226 B2 | 1/2011 | Shimada |
| 8,508,534 B1* | 8/2013 | George et al. ............... 345/473 |
| 2002/0045422 A1* | 4/2002 | Iwase et al. ................... 455/1 |
| 2003/0103680 A1 | 6/2003 | Westerman |
| 2003/0133512 A1* | 7/2003 | Moni et al. ................... 375/246 |
| 2004/0210813 A1 | 10/2004 | Kim |
| 2007/0143663 A1* | 6/2007 | Hansen et al. ............... 715/512 |
| 2008/0123904 A1 | 5/2008 | Sakamoto et al. |
| 2010/0020970 A1* | 1/2010 | Liu et al. ...................... 380/255 |
| 2010/0067674 A1 | 3/2010 | Lee |
| 2011/0037767 A1* | 2/2011 | Casanova et al. ............ 345/473 |
| 2011/0099176 A1 | 4/2011 | Schundler |

FOREIGN PATENT DOCUMENTS

| | | |
|---|---|---|
| EP | 1 633 103 | 8/2009 |
| KR | 1020010015025 | 2/2001 |
| KR | 1020060099385 | 9/2006 |
| KR | 1020080039606 | 5/2008 |
| KR | 10-1094585 | 12/2011 |

OTHER PUBLICATIONS

ArtLex (ArtLex's A-Ac Page, http://www.artlex.com/ArtLex/A.html, Internet Archive date: Mar. 21, 2006).

Korean Office Action dated Apr. 5, 2016 issued in counterpart application No. 10-2010-0028178, 21 pages.

* cited by examiner

METHOD AND APPARATUS FOR CREATING ANIMATION MESSAGE

PRIORITY

This application is a divisional application of U.S. patent application Ser. No. 13/012,201, filed on Jan. 24, 2011, which claims priority under 35 U.S.C. §119 to applications entitled "Method and Apparatus for Creating Animation Message" filed in the Korean Intellectual Property Office on Jan. 22 and Mar. 29, 2010 and assigned Serial Nos. 10-2010-0006192 and 10-2010-0028178, respectively, the entire disclosures of which are incorporated herein by reference.

BACKGROUND OF THE INVENTION

1. Field of the Invention

The present invention relates generally to a message service of a mobile communication terminal, and in particular, to a method and apparatus for creating and reproducing an animation message, whereby written or picture-type input information input by a user through a touch screen can be created as a message, and the created message can be reproduced as an animation according to input order.

2. Description of the Related Art

Developments in wired or wireless communication technology, multimedia technology, hardware, such as Central Processing Unit (CPU) and memory, manufacturing technology, power charging technology, and the like, have reinforced mobile terminal functionality. For example, although a conventional mobile terminal is capable of delivering desired content to another party through a voice call, once transmission and reception of character messages became possible, when a voice call is impossible or when simple content needs to be delivered, the desired content can be easily delivered another party through a Short Message Service (SMS) containing the character content.

SMS has evolved to Long Message Service (LMS) containing long character content and further to Multimedia Message Service (MMS) containing a multimedia file, such as an image or a moving picture, and these developments provide more varying benefits to the user. Specifically, unlike SMS or LMS for transmitting only character content, the MMS demand for transmitting a multimedia file has been gradually increasing due to its scalability of expression. A method for transmitting desired content by using MMS will now be described.

FIG. 1 illustrates information transmission using conventional MMS.

Referring to FIG. 1, an MMS message can be edited by a user inputting desired characters in a drawing (or handwriting) recognition area and/or attaching an image. In the case of the drawing recognition area on an MMS input screen illustrated in FIG. 1, three unit recognition zones for recognizing one character at a time exist, and the user inputs desired character information by using a finger or an input tool such as a stylus pen. In addition, the user may attach an image stored in a memory by using a file attach zone located below a character input window and transmit the image.

However, presently used MMS performs transmission of only a stored image. If a sending party desires to transmit directly written content via MMS, the directly written content must be converted to an image file by using a separate program, stored, and then transmitted. Moreover, when the directly written content is converted to the image file, the image file corresponds to a sheet of a still image, so the image file does not contain sequential time information according to user writing.

That is, when a receiving party receives an MMS message, the MMS message is only shown as a sheet of still image but cannot be sequentially reproduced according to a content drawing process of the sending party, so handwriting or emotion of the sending party cannot be delivered received, thereby making the feeling of movement disappear.

SUMMARY OF THE INVENTION

An object of the present invention is to substantially solve at least the above problems and/or disadvantages and to provide at least the advantages below. Accordingly, an object of the present invention is to provide a method and apparatus for creating and reproducing an animation message, whereby written or picture-type input information input by a user through a touch screen can be created as a message, and the created message can be reproduced as an animation according to input order.

Another object of the present invention is to provide a method for concealing additional information contained in an animation message into a drawing area, an encoding/decoding method, and a method for setting a parity bit for error correction when the animation message is created, and an apparatus therefore. Further another object of the present invention is to provide a method and apparatus for delivering additional information through an encoding area by separately setting the encoding area besides a drawing area in an animation message. According to one aspect of the present invention, there is provided a method for creating an animation message, the method including generating input information containing information regarding input time and input coordinates according to input order of drawing information input through a touch screen; dividing an image containing the drawing information and background information into a plurality of blocks; creating an animation message by mapping the input information to the plurality of blocks so that the drawing information can be sequentially reproduced according to the input order; allocating a parity bit per pre-set block range of the animation message in order to detect an error occurring in the animation message; and transmitting the created animation message.

According to another aspect of the present invention, there is provided a method for reproducing an animation message, the method including receiving the animation message; performing error correction of the animation message by calculating a mean pixel value for the size of every pre-set bit analysis unit block in the animation message and estimating a bit value of every corresponding block according to a result of comparison of the mean pixel value with a pre-set value; generating input information containing information regarding input time and input coordinates according to input order of the animation message by extracting a value mapped according to a pixel value of every block of the animation message; and reproducing the animation message according to the input information of the animation message.

According to still another aspect of the present invention, there is provided an apparatus for creating and reproducing an animation message, the apparatus including an input/output unit for receiving an animation message input by a user by being constructed with a touch screen and outputting an image received from a controller; the controller for generating input information regarding input time and input coordinates according to input order of drawing information input through the touch screen, dividing an image containing the drawing information and background information into a plurality of blocks, creating an animation message by mapping the input information to the plurality of blocks so that the drawing information can be sequentially reproduced according to the input order, allocating a parity bit per pre-set block range of the animation message in order to detect an error occurring in the animation message, and transmitting the created animation message; and a wireless communication unit for transmitting and receiving the animation message.

According to yet another aspect of the present invention, there is provided a method for creating an animation message, the method including generating input information containing information regarding input time and input coordinates according to input order of drawing information input through a touch screen; displaying a drawing image of the input drawing information in a drawing area pre-set in the animation message; allocating an encoding area for storing the input information to a part pre-set in the animation message and dividing the encoding area into a plurality of blocks having a pre-set size; creating display content of the encoding area by mapping the input information to the plurality of blocks of the encoding area pre-set in the animation message; creating the animation message containing the drawing area and the encoding area; and transmitting the created animation message.

According to still another aspect of the present invention, there is provided a method for reproducing an animation message, the method including receiving the animation message; extracting a drawing image from a drawing area of the animation message; extracting a bit value mapped according to a gray value of every block of an encoding area of the animation message; generating input information containing information regarding input time and input coordinates according to input order of the animation message according to the bit values; and reproducing the animation message according to the input information of the animation message.

According to another aspect of the present invention, there is provided an apparatus for creating an animation message, the apparatus including an input/output unit for receiving an animation message input by a user by being constructed with a touch screen and outputting an image received from a controller; the controller for generating input information regarding input time and input coordinates according to input order of drawing information input through the touch screen, displaying a drawing image of the input drawing information in a drawing area pre-set in the animation message, allocating an encoding area for storing the input information to a part pre-set in the animation message, dividing the encoding area into a plurality of blocks having a pre-set size, creating display content of the encoding area by mapping the input information to the plurality of blocks of the encoding area pre-set in the animation message, and creating the animation message containing the drawing area and the encoding area; and a wireless communication unit for transmitting and receiving the animation message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EMBODIMENTS
OF THE PRESENT INVENTION

Hereinafter, embodiments of the present invention will be described in detail with reference to the accompanying drawings. In the following description, although many specific items, such as components of a concrete circuit, are discussed, they are only provided to help general understanding of the present invention, and it will be understood by those of ordinary skill in the art that the present invention can be implemented without these specific items. In the following description, well-known functions or constructions are not described in detail to avoid obscuring the invention with unnecessary detail.

Figure 1:
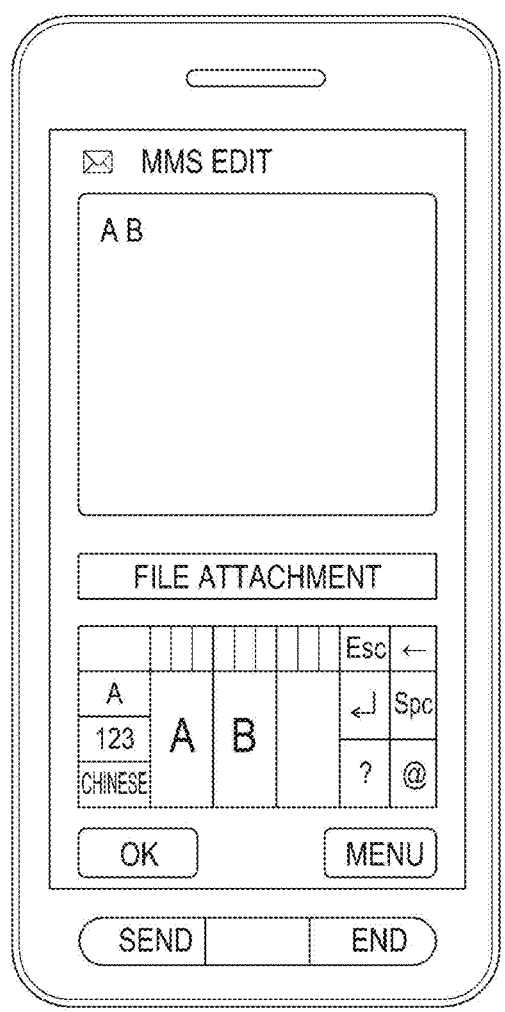
FIG. 1 illustrates message transmission using conventional MMS.
Figure 2:
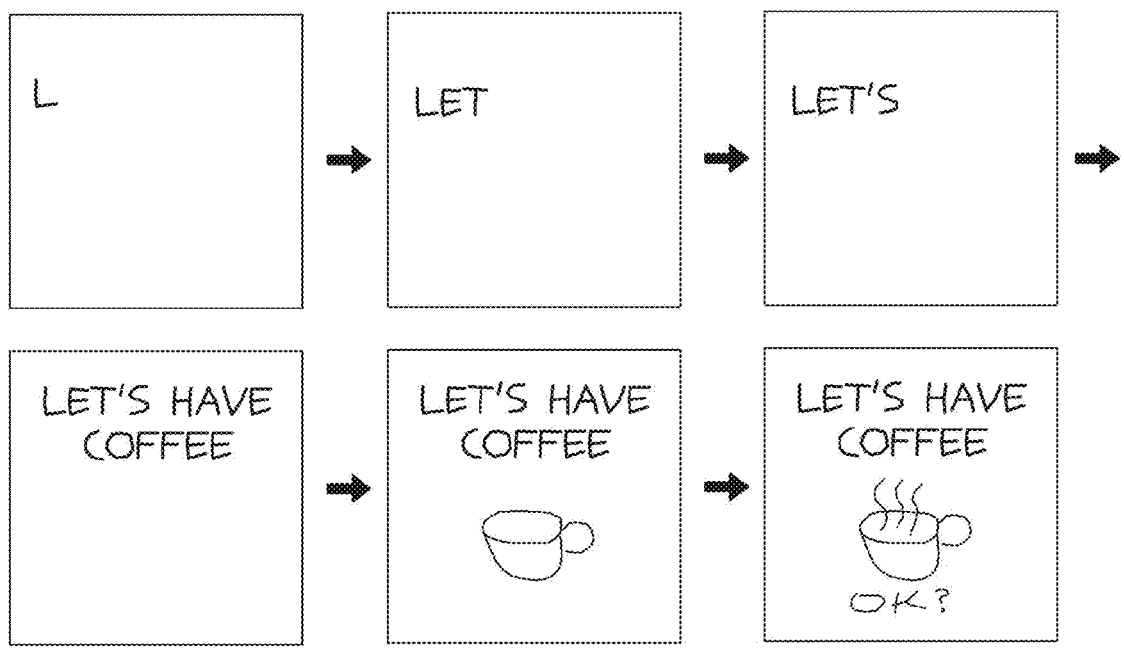
FIG. 2 illustrates a process of reproducing an animation message according to an embodiment of the present invention.

FIG. 2 illustrates a process of reproducing an animation message according to an embodiment of the present invention. As illustrated in FIG. 2, the present invention provides a method and apparatus for creating an animation message, whereby written or picture-type input information input by a user through a touch screen can be created as a message, and the created message can be reproduced as an animation according to input order.

In addition, the present invention provides a method and apparatus for concealing additional information, such as point coordinates, stroke attributes, a writing or drawing order, and color tones of written characters and a picture contained in a message, an encoding/decoding method, and a method for setting a frequency-space parity bit for error correction.

In addition, the present invention provides a method and apparatus for creating an animation message by separately setting an encoding area besides a drawing area and inserting input information into the encoding area.

To do this, the present invention provides a method for encoding/decoding animation information through an application of variable blocks, pattern switching, an application of adaptive mixed levels, and pixel value estimation according to a mean pixel value by taking visibility of the sense of human sight and characteristics of a Joint Photographic Experts Group (JPEG) image into account and correcting an error, which may occur between an output end of a transmission terminal and an input end of a reception terminal, by inserting a frequency/space parity bit. Hereinafter, the features of the present invention will be described in detail with reference to the accompanying drawings.

Figure 3:
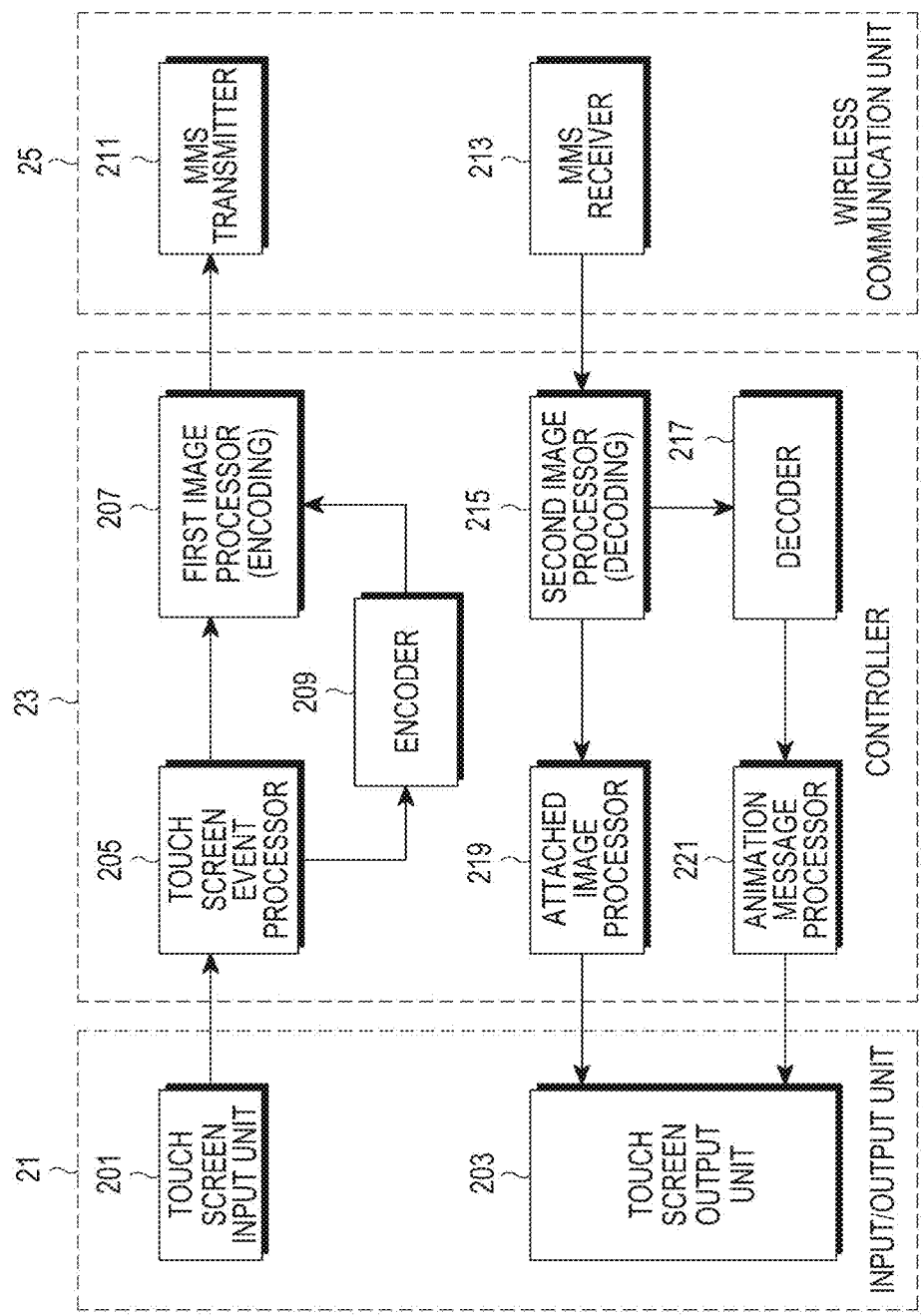
FIG. 3 is a block diagram of a mobile terminal for transmitting and receiving an animation message according to an embodiment of the present invention.

FIG. 3 is a block diagram of a mobile terminal for transmitting and receiving an animation message according to an embodiment of the present invention.

Referring to FIG. 3, the mobile terminal includes an input/output unit 21, a controller 23, and a wireless communication unit 25 in order to transmit and receive an image containing an animation message having sequential time information. The input/output unit 21 includes a touch input unit 201 and a touch screen output unit 203, the controller 23 includes a touch screen event processor 205, a first image processor 207, a second image processor 215, an encoder 209, a decoder 217, an attached image processor 219, and an animation message processor 221, and the wireless communication unit 25 includes an MMS transmitter 211 and an MMS receiver 213.

The input/output unit 21 receives an animation message input by a user and outputs an image received from the controller 23. That is, the touch input unit 201 receives the animation message input by the user, and the touch screen output unit 203 outputs the image. The touch input unit 201 transmits input information according to a time of a user input to the controller 23. Although the touch input unit 201 and the touch screen output unit 203 have been functionally separated and described, they can be configured as one touch screen 21.

The controller 23 detects input position information according to the time by analyzing the input information received from the input/output unit 21, encodes the detected input position information, and transmits the encoded input position information to the wireless communication unit 25, and detects time information and position information contained in an image received from the wireless communication unit 25 and transmits the detected time information and position information to the input/output unit 21.

The touch screen event processor 205 of the controller 23 analyzes the animation message received from the input/output unit 21 on a pre-set event basis, transmits analyzed at least one piece of event information (input information) to the encoder 209, and transmits the animation message (a written input image) to the first image processor 207. The encoder 209 generates at least one code by encoding at least one piece of event information (information regarding point coordinates, order, strokes, color tones, etc.) analyzed by the touch screen event processor 205. The encoding is achieved by lossless compression or ratio compression, and at least one code generated by the encoding is used to reproduce the animation message according to the sequential time information in a receiving party in the future. In addition, additional information, such as information regarding a terminal for creating the animation message, a creation time, an application, and an encoding scheme, may be generated and included in the animation message. The encoded at least one code is transmitted to the first image processor 207. The first image processor 207 converts the animation message received from the touch screen event processor 205 and the encoded at least one code to a single image by concealing them in a mapping method using a pixel value difference difficult to identify by the human eye and compresses the converted image in a format, such as JPEG, according to an embodiment of the present invention.

The first image processor 207 divides the received animation message into a plurality of blocks, maps a bit value to a specific pixel value of each of the blocks, inserts information regarding at least one code generated through the input information into the animation message, and allocates a parity bit for detecting an error occurring in the animation message.

When the animation message is divided into the plurality of blocks, a size of each of the blocks to be used to divide the animation message is determined according to a data amount of the animation message input by the user.

In addition, when a bit value is mapped to a specific pixel value of each of the blocks, blocks for a stroke part are distinguished from blocks for a background part, and the blocks are set so that if a pixel value of a block for the background part is 0, the block is set to 0, and if a pixel value of a block for the background part is a first pixel value greater than 0, the block is set to 1, and if a pixel value of a block for the stroke part is 255, the block is set to 1, and if a pixel value of a block for the stroke part is a second pixel value less than 255, the block is set to 0.

In addition, when a bit value is mapped to a specific pixel value of each of the blocks, the blocks can be set so that a plurality of blocks to which information regarding at least one code is mapped are divided into specific blocks, two colors having a pixel value difference are alternately arranged to the specific blocks, and it is determined which bit value is indicated by a corresponding block according to an arrangement pattern.

In addition, when a parity bit for detecting an error occurring in transmission of the animation message is allocated, one parity bit may be allocated to every column composed of blocks of the animation message, one parity bit may be allocated to every row composed of blocks of the animation message, and one parity bit may be allocated to every specific block by dividing blocks of the animation message into specific blocks having a pre-set size.

Alternatively, the first image processor 207 generates an image by displaying a final image of animation input information received from the touch screen event processor 205 in a drawing area of the animation message and displaying a pixel or block displayed with a pre-set gray color, which corresponds to at least one code received from the encoder 209, in an encoding area of the animation message and compresses the image in a format, such as JPEG, according to another embodiment of the present invention.

According to another embodiment of the present invention, the first image processor 207 displays an input drawing image in a drawing area pre-set in the animation message, allocates an encoding area for storing input information to a pre-set part of the animation message, divides the encoding area into a plurality of blocks having a pre-set size, creates display content of the encoding area by mapping the input information to corresponding blocks of the encoding area pre-set in the animation message, and creates the animation message containing the drawing area and the encoding area.

Input information contains at least one of an input order of written strokes, attributes of the written strokes, an input color of the written strokes from among input drawing information.

The encoding area is located at a lower end of the drawing area and includes a pre-set sized signature area for displaying a signature. The signature area includes content set by the user, previously provided content, communication provider advertisement, or business advertisement, each of width and length of the signature area is set to a multiple of 16, and each of a horizontal axis position and a vertical axis position of coordinates of a starting position of the upper left end of the signature area is set to a multiple of 16.

When the first image processor 207 creates the display content of the encoding area by mapping the input information to corresponding blocks of the encoding area pre-set in the animation message, the input information is converted to at least one code value, and at least one code value is mapped so that a level of a gray value of a corresponding block is changed and displayed according to a bit value of a corresponding code value in correspondence with each block of the encoding area, and levels of the gray value may be represented by 4 levels capable of displaying a 2-bit value or 8 levels capable of displaying a 3-bit value.

According to an embodiment of the present invention, the second image processor 215 decompresses an image compressed by JPEG or the like to decode at least one code included in an image received from the wireless communication unit 25. The decompressed image is transmitted to the decoder 217. If no code is included in the received image after the received image is decompressed and analyzed, the second image processor 215 determines that the received image is an image not including additional information and transmits the received image to the attached image processor 219. Upon receiving the image, the attached image processor 219 transmits the image to the touch screen output unit 203 to output the image on a screen as received. The decoder 217 decodes at least one code included in the image and confirms time information and position information corresponding to each of at least one code. If every code included in the image is decoded, the decoder 217 transmits the decoded information to the animation message processor 221. The animation message processor 221 sequentially reproduces an animation message by using decoded event information received from the decoder 217. Since the decoded information includes the time information and the position information, input information of the user can be sequentially reproduced.

According to another embodiment of the present invention, the second image processor 215 extracts a drawing image from a drawing area of a received animation message, extracts a bit value mapped to a gray value of each of blocks in an encoding area of the received animation message, generates input information including information regarding input times and input coordinates according to an input order of the animation message based on the bit values, and reproduces the animation message according to the input information of the animation message through the animation message processor 221.

The wireless communication unit 25 transmits and receives an image, wherein the MMS transmitter 211 transmits an image and the MMS receiver 213 receives an image.

A description will now be made of a process of creating and transmitting an animation message and a process of receiving and reproducing a message in a receiving party.

To encode an animation message according to an embodiment of the present invention, pixel values of pre-set N×N blocks are first set to represent each bit value indicating 0 or 1 by a pixel value difference difficult for people to perceive by considering visibility of the sense of human sight in order to conceal input information, such as written characters and a picture.

Figure 4:
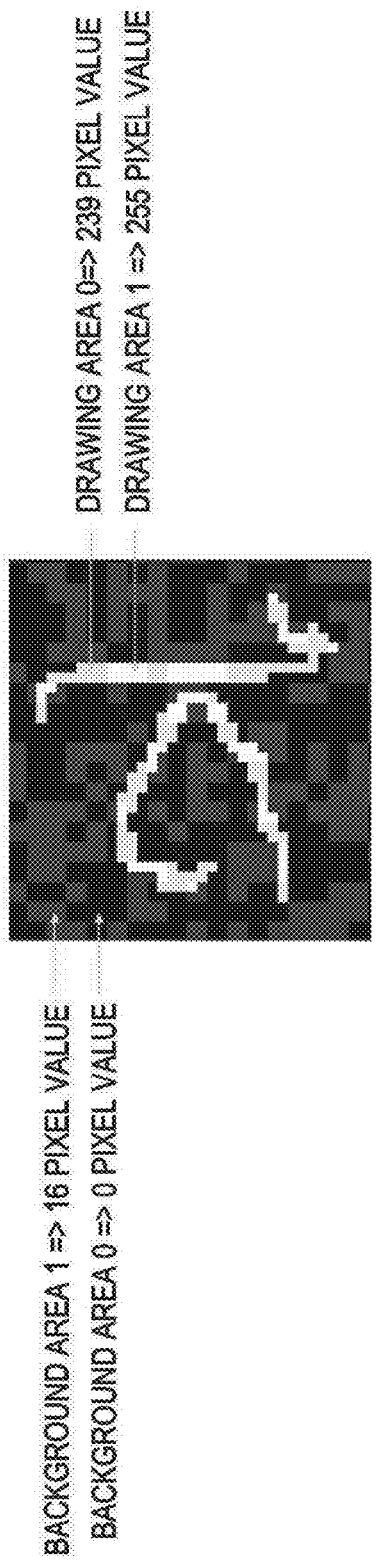
FIG. 4 illustrates an image in which additional information is concealed in creation of an animation message according to an embodiment of the present invention.

FIG. 4 illustrates an image in which additional information is concealed in creation of an animation message according to an embodiment of the present invention. For example, FIG. 4 shows an image encoded in a 2×2-block size. Referring to FIG. 4, when a block belongs to a background area, a pixel value 0 of a black color is allocated to the block to allocate a bit value 0 thereto, and a pixel value 16, which is a little bit brighter than the pixel value 0 of the black color and is difficult to perceive a difference from the pixel value 0 with human eyes, is allocated to the block to allocate a bit value 1 thereto.

Likewise, when a block belongs to a stroke area, a pixel value 255 of a white color is allocated to the block to allocate a bit value 1 thereto, and a pixel value 239, which is difficult to perceive a difference from the pixel value 255 with human eyes, is allocated to the block to allocate a bit value 0 thereto. The pixel value 16 indicating 1 in the background area and the pixel value 239 indicating 0 in the stroke area may be adjusted according to a level of an information loss due to encoding and transmission of a JPEG image. Likewise, in a case of a color image, when a block belongs to a red stroke area, a pixel value of RGB (255, 0, 0) may be allocated to the block to represent a bit value 1, and a pixel value of RGB (239, 0, 0) may be allocated to the block to represent a bit value 0.

Figure 5:
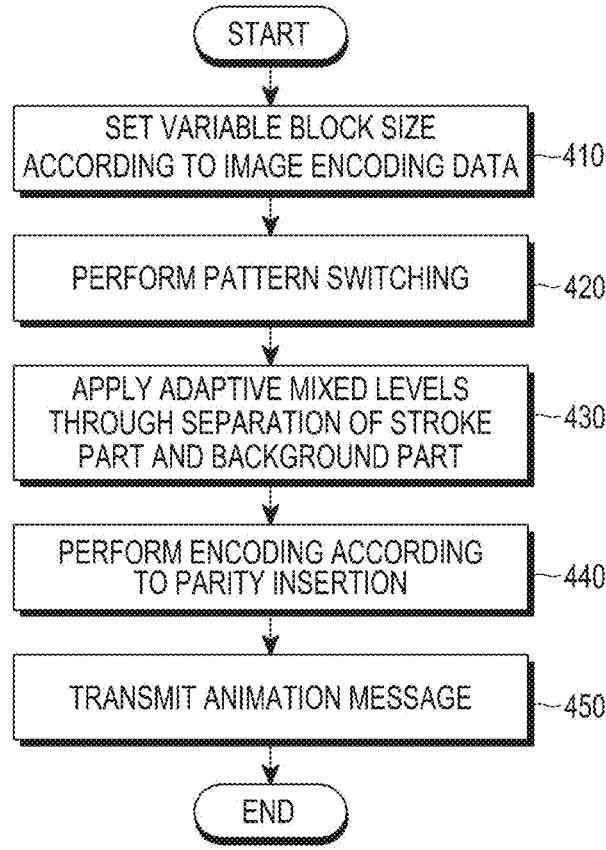
FIG. 5 is a flowchart of an operation of creating an animation message according to an embodiment of the present invention.
Figure 6:
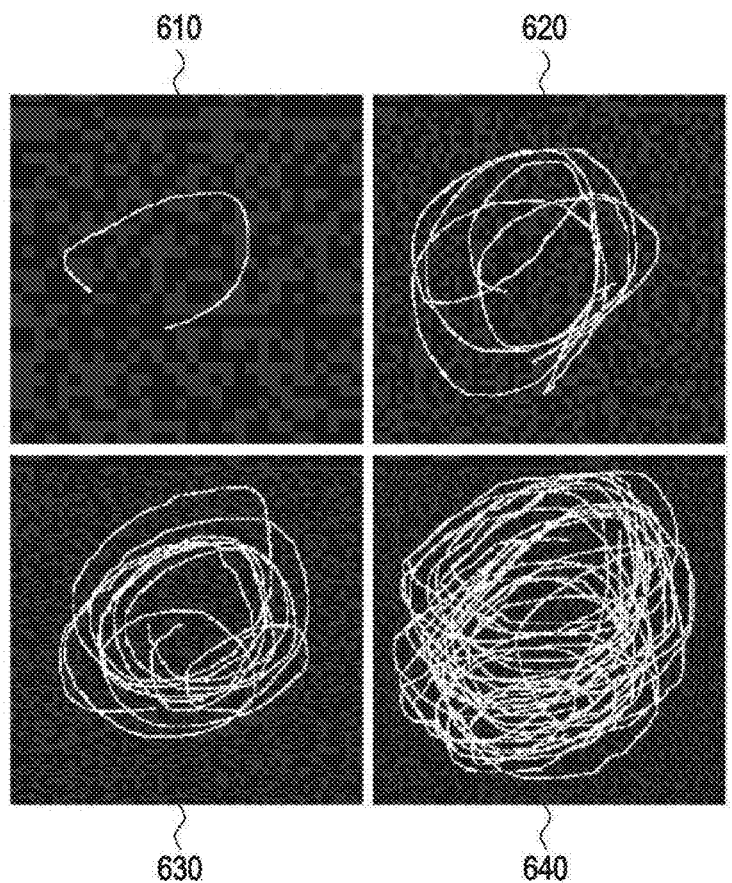
FIG. 6 illustrates an application of a variable block according to a data amount of input information in creation of an animation message according to an embodiment of the present invention.

FIG. 5 is a flowchart of an operation of creating an animation message according to an embodiment of the present invention. A description will be made of an operation of creating and transmitting/receiving an animation message with reference to FIG. 5. In Step 410, sizes of variable blocks for image encoding are set by the controller 23 of the mobile terminal to represent input information with a fine difference between pixel values of the variable blocks of an animation message. That is, even though a loss occurs in encoding and transmitting a JPEG image in a case of information concealment, since reliability of information is high as a block size is large, reliability of a unit of bit analysis is high. To use this, the present invention variably changes and uses a block size as illustrated in FIG. 6. FIG. 6 illustrates an application of a variable block according to a data amount of input information in creation of an animation message according to an embodiment of the present invention. Referring to FIG. 6, if an amount of information regarding an animation message is small, encoding is performed by allocating a relatively large block to a unit of bit analysis, and if an amount of information regarding an animation message is large, encoding is performed by allocating a relatively small block to a unit of bit analysis, thereby securing reliability robust to an information loss. Thus, according to the order of a less amount of information, a block of the largest size is allocated to a first message 610, and gradually smaller-sized blocks are sequentially allocated to a second message 620, a third message 630, and a fourth message 640.

Figure 7:
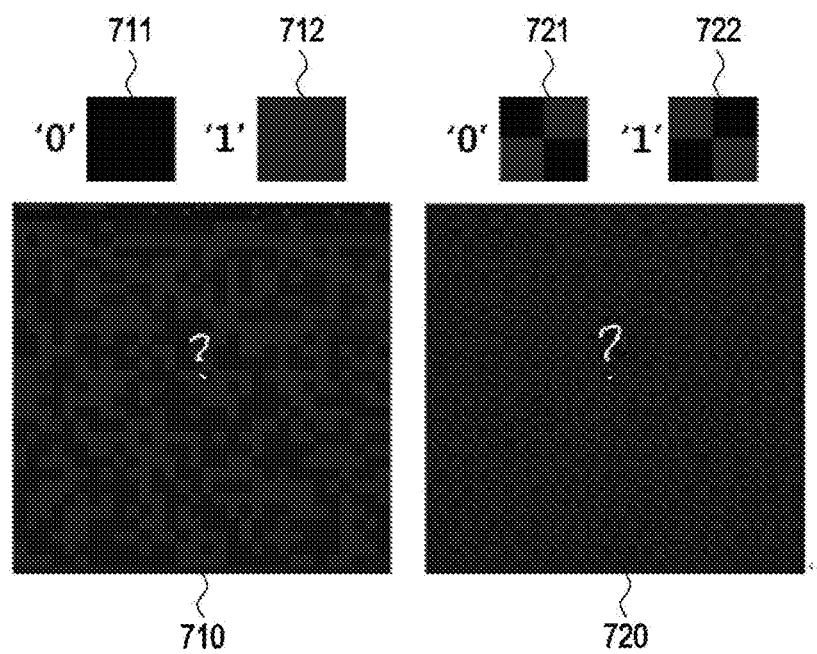
FIG. 7 illustrates a method of concealing information by pattern switching in creation of an animation message according to an embodiment of the present invention.

In Step 420, pattern switching of an image is performed. The controller 23 generates sub-blocks in each variable block in encoding to increase concealment performance. That is, if an initially generated block has a 4×4 size, pattern switching may be performed after dividing the block into sub-blocks having a 2×2 or 1×1 size, which is the smallest sub-unit. FIG. 7 illustrates a method of concealing information by pattern switching in creation of an animation message according to an embodiment of the present invention. Referring to FIG. 7, an image 710 for which pattern switching has not been performed displays the entire of one block with the same color to represent a bit value 0 or 1, whereas an image 720 for which pattern switching has been performed displays a certain pattern by dividing one block into sub-blocks and mixing a color indicating a bit value 0 and a color indicating a bit value 1. That is, in a case where a block 712 indicating a bit value 1 is divided into 2×2-sub-blocks before the pattern switching is performed, if pixel values of the sub-blocks are 16, 16, 16, and 16, the pattern switching is performed by allocating 16, 0, 16, and 0 to the pixel values of the sub-blocks as in a block 722. Thus, even though a size of a variable block is large, the concealment performance can be maintained in a minimum block unit.

In Step 430, mixed pixel value levels are adaptively allocated to the image according to a stroke part and a background part of the image. Accordingly, a data amount can increase while maintaining the concealment performance.

In JPEG image compression, an information loss occurs in a Discrete Cosine Transform (DCT) process and a quantization process. The information loss mainly occurs in the quantization process, and specifically, pixel values are significantly distorted in an area, such as a stroke, having a lot of high frequency components. That is, pixel value distortion of around 0-10 occurs in the background part, while pixel value distortion of around 0-50 occurs in the stroke part. This mainly occurs in an operation of removing high frequency components according to the feature of the quantization process, wherein the pixel value distortion occurs in an 8×8-sized block unit for a gray image and a 16×16-sized block unit for a color image. By using this characteristic, an input image is divided in a unit of 8×8 (gray) or 16×16 (color), blocks including a stroke are designated to stroke blocks, the remaining blocks are designated to background blocks, a pixel value level increases for the stroke blocks (e.g., a doubled level of the background blocks), and a pixel value level is lowered for the background blocks compared with the stroke blocks, thereby increasing reliability of information.

Figure 8:
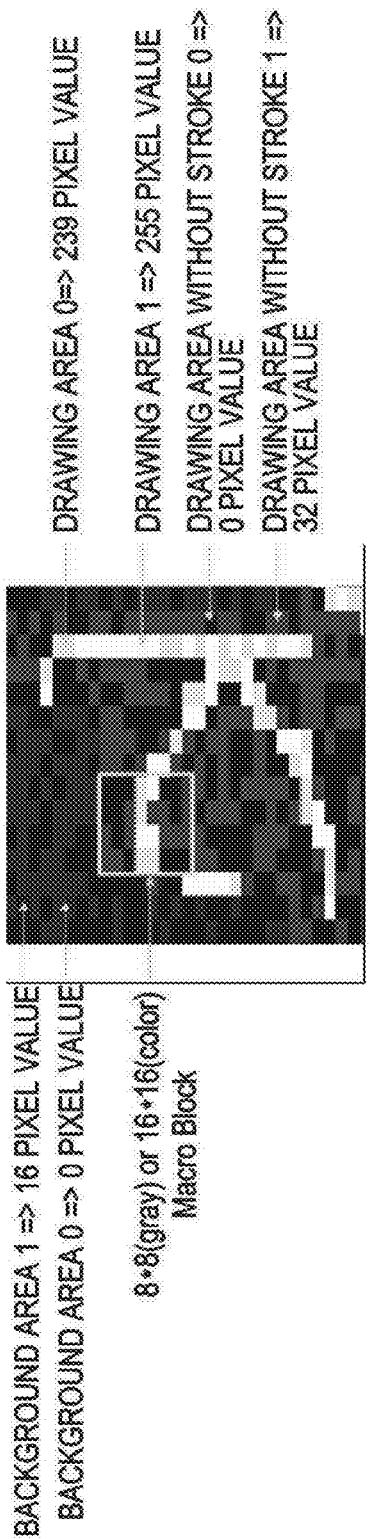
FIG. 8 illustrates an application of levels according to a stroke part and a background part in creation of an animation message according to an embodiment of the present invention.

FIG. 8 illustrates an application of levels according to a stroke part and a background part in creation of an animation message according to an embodiment of the present invention. Referring to FIG. 8, for divided blocks, 255 is allocated to a stroke block in a case where a unit of bit analysis is 1 in a stroke of the stroke block, 239 is allocated to a stroke block in a case where a unit of bit analysis is 0 in a stroke of the stroke block, 32 is allocated to a stroke block in a case where a unit of bit analysis is 1 in a background of the stroke block, 0 is allocated to a stroke block in a case where a unit of bit analysis is 0 in a background of the stroke block, 16 is allocated to a background block of which a unit of bit analysis is 1, and 0 is allocated to a background block of which a unit of bit analysis is 0. Accordingly, levels can be adaptively adjusted by using presence/absence of a stroke and the characteristic of a JPEG image, thereby securing the same reliability as the stroke blocks while maintaining the concealment performance according to visibility of human eyes.

In Step 440, parity bits are inserted for error correction. To overcome the information loss of a JPEG image, Hamming code and Reed Solomon code correct an error by generally adding parity bits corresponding to 10-60% of original data. However, the present invention applies parity bits to only stroke blocks without applying parity bits to background blocks of which reliability is high by using frequency domain parity code according to the features of the present invention, thereby saving a 5-30% data amount.

The present invention performs error correction suitable for 2-dimensional image characteristics by inserting a small number of parity bits compared with original data according to the use of parity bits corresponding to a frequency (width, height) of an image and parity bits corresponding to a space (M×M blocks) of the image when an animation message is encoded by the controller 23.

Figure 9:
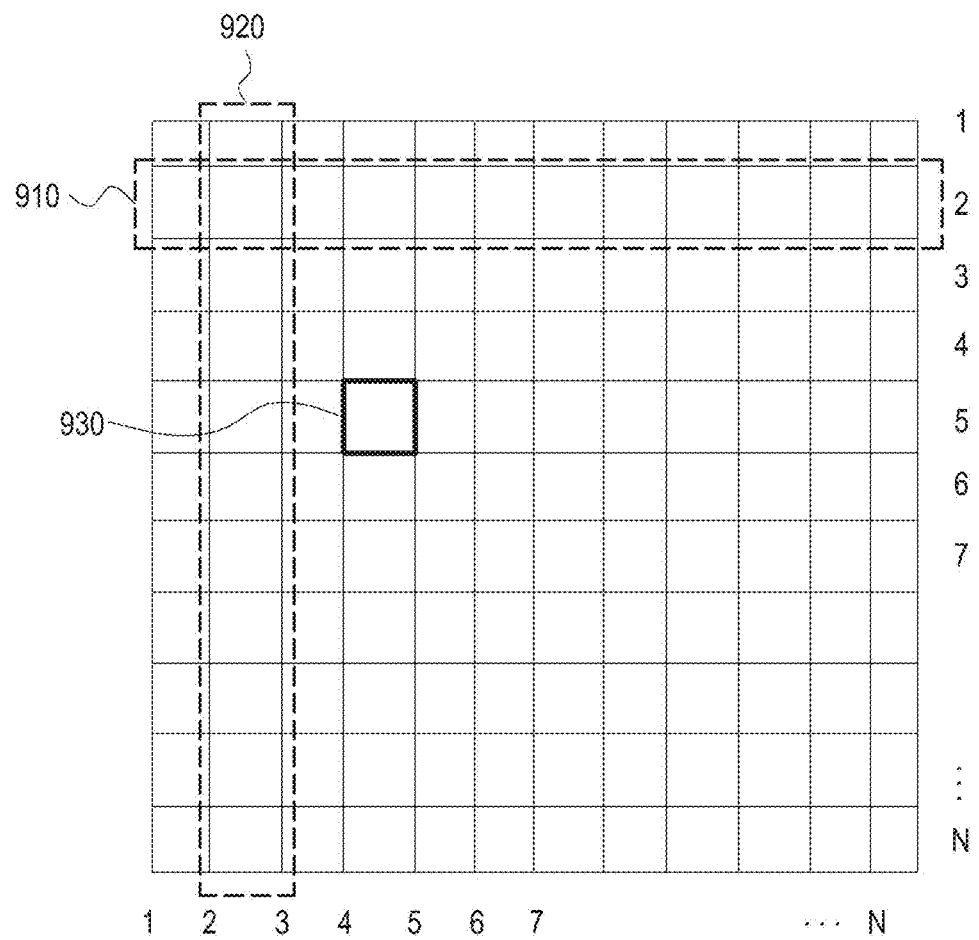
FIG. 9 illustrates a method of allocating frequency and space parity bits in creation of an animation message according to an embodiment of the present invention.

FIG. 9 illustrates a method of allocating frequency and space parity bits in creation of an animation message according to an embodiment of the present invention. As illustrated in FIG. 9, an input image is divided into N×N-sized blocks, 1 parity bit is allocated to each column (width) of the blocks (refer to 910), and 1 parity bit is allocated to each row (height) of the blocks (refer to 920). In addition, each N×N-sized block is divided into pre-set M×M-sized blocks, and 1 parity bit is allocated to each M×M block (refer to 930). Each parity bit indicates that the number of 1s in an allocated area is an odd or even number. Thus, an error candidate bit block is extracted through frequency parity check (width, height), and if a 1-bit error has occurred in an M×M block corresponding to a pre-set space, the error candidate bit block is corrected. If a two or more-bit error has occurred in the space, a reliability level is set for each bit block pixel value, and error correction is performed according to priority of reliability levels. In general, Hamming code or Reed Solomon code has error correction performance of 1 error to 7-10 bits by inserting parity bits corresponding to around 15-60% of original data. However, according to the method of correcting an error by inserting frequency and space parity bits according to an embodiment of the present invention, when 1 parity bit is inserted into each column and each row for a 48×48 block in terms of a frequency and 1 parity bit is inserted into each 4×4 block in terms of a space, additional data corresponding to around 10% of original data is required. An animation message is created through the above-described procedures, and in Step 450, a mobile terminal of a sending party transmits the created animation message to a mobile terminal of a receiving party, and the mobile terminal of the receiving party receives the animation message and performs error correction based on parity bits and decoding.

An animation reproducing operation of the mobile terminal of the receiving party will now be described. The second image processor 215 performs error correction of the received animation message, extracts a code value indicating input information mapped according to a pixel value of each block of the animation message, and delivers the code values to the decoder 217, the decoder 217 generates the input information of the animation message by decoding the code values represented with 0 and 1, and the animation message processor 221 reproduces the animation message according to the generated input information of the animation message.

Figure 10:
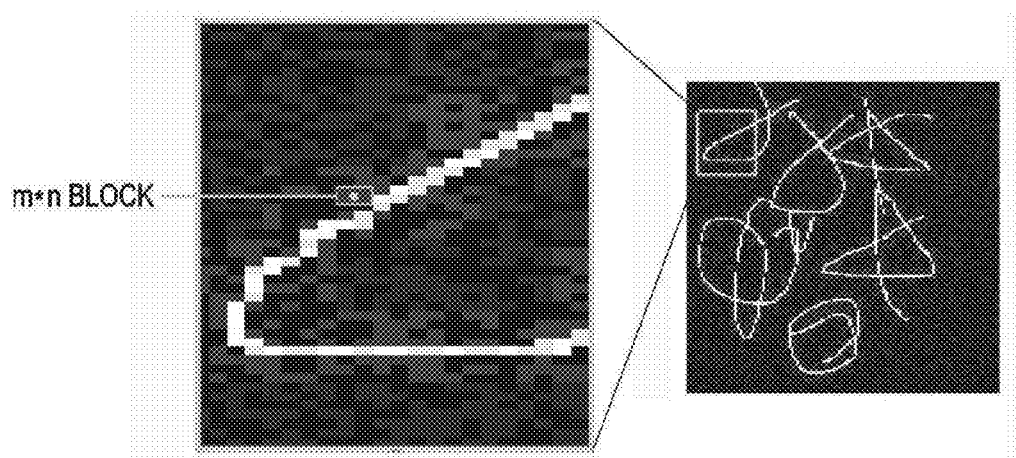
FIG. 10 illustrates a method of correcting an error due to a quantization loss in decoding of an animation message according to an embodiment of the present invention.

FIG. 10 illustrates a method of correcting an error due to a quantization loss in decoding of an animation message according to an embodiment of the present invention. Referring to FIG. 10, a bit value 0 or 1 is determined using a mean value of pixel values of an m×n (2×1~8×8) block, which is a unit of bit analysis. Since a neighboring pixel value decreases as a pixel value increases due to distortion according to a quantization loss based on image characteristics, a mean pixel value of a bit analysis unit block has a compensation effect. Thus, in a case of 16 levels by which pixel values of a block are determined as 0 to 16 in a background area, a bit value of a bit analysis unit block is determined as 1 if a mean pixel value of the bit analysis unit block is equal to or greater than 8, which is a mean of 0 and 16, and a bit value of a bit analysis unit block is determined as 0 if a mean pixel value of the bit analysis unit block is less than 8. Here, a difference value from 239 is used as each pixel value of a bit analysis unit block in a stroke area including a stroke. That is, a pixel value 255 is determined as 16, and a pixel value 239 is determined as 0. Because reliability of blocks in a background area is generally high, error correction may not be performed for the blocks in the background area.

Figure 11:
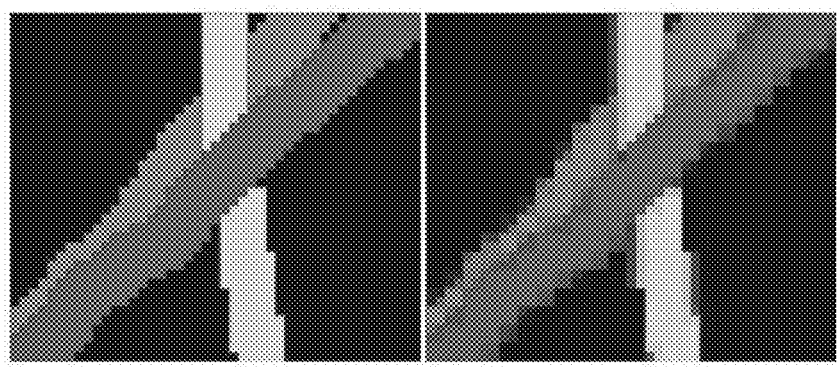
FIG. 11 illustrates color distortion according to encoding of a JPEG image.

FIG. 11 illustrates color distortion according to encoding of a JPEG image.

The above-described embodiment can be applied to a case where an animation message is represented by black and white, and for an RGB color image, if a block belongs to a red stroke area, the block can be represented by allocating a pixel value RGB (255, 0, 0) to represent a bit value 1 and allocating a pixel value RGB (239, 0, 0) to represent a bit value 0.

However, due to JPEG encoding and distortion in an input device and a communication network, a color change occurs in a boundary area due to color tone distortion and a JPEG quantization loss as illustrated in FIG. 11, and in a case of a color image, when concealment encoding is performed using a color written image, distortion may occur in encoded information.

Figure 12:
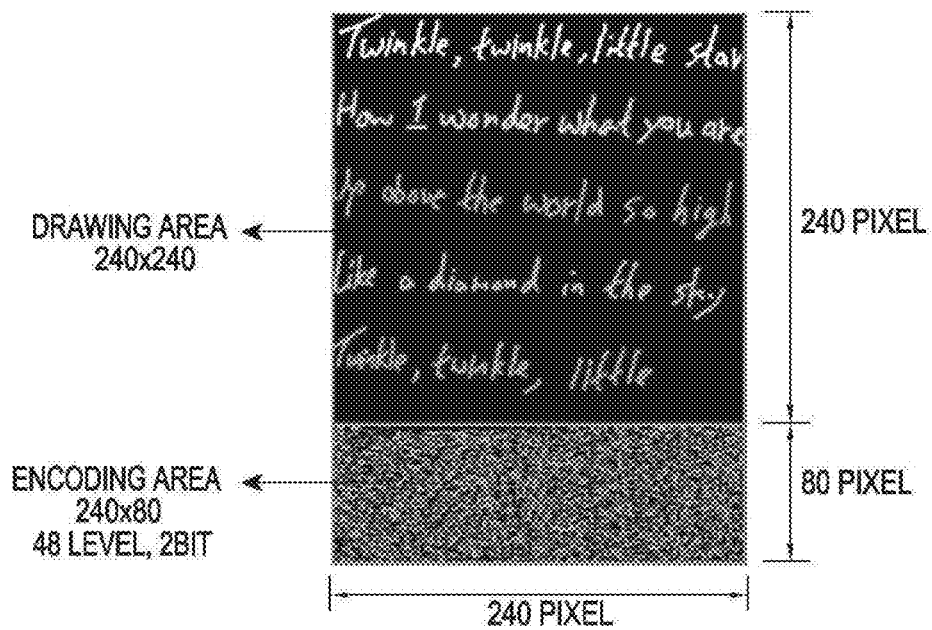
FIG. 12 illustrates an animation message according to another embodiment of the present invention.

FIG. 12 illustrates an animation message according to another embodiment of the present invention. As illustrated in FIG. 12, recently, a typical touchable terminal supports over QVGA (320×240) as resolution of an input image. Thus, the present invention can set a drawing area as a 240×240 area and utilize a 240×80 area below the drawing area as an encoding area. Alternatively, an upper area, an edge area, or an upper and lower area of the drawing area may be set as the encoding area and utilized. Here, not to receive an influence of the JPEG color distortion, the encoding area is set as a size of a multiple of 16×16, which is a macroblock size, and a starting position of the encoding area is set as a multiple of 16×16.

However, since a gray color is displayed in the encoding area, the encoding area may be too uncommon for a user to view. To overcome this, the present invention may display user signature having an M×N size in the encoding area according to a feature of the present invention.

Figure 13:
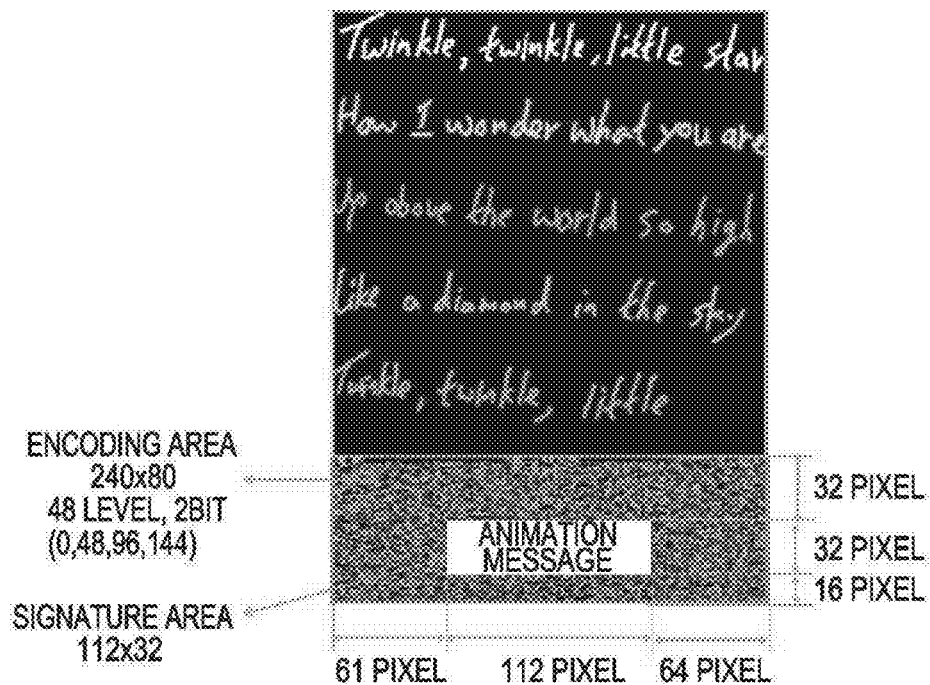
FIG. 13 illustrates a format of an animation message according to another embodiment of the present invention.

FIG. 13 illustrates a format of an animation message according to another embodiment of the present invention. As illustrated in FIG. 13, a signature area for displaying user signature may be added in the encoding area according to another embodiment of the present invention. Here, since a macroblock size for JPEG encoding is 16×16, a size of the signature area must be a multiple of 16. In addition, each element of a starting point (x, y) of relative position coordinates in 320×240, which is a size of the entire animation message image, must be a multiple of 16. That is, a size of each of width and height is set as a multiple of 16, and each of a horizontal axis position and a vertical axis position of coordinates of an upper left starting position of the signature area is set as a multiple of 16.

Figure 14:
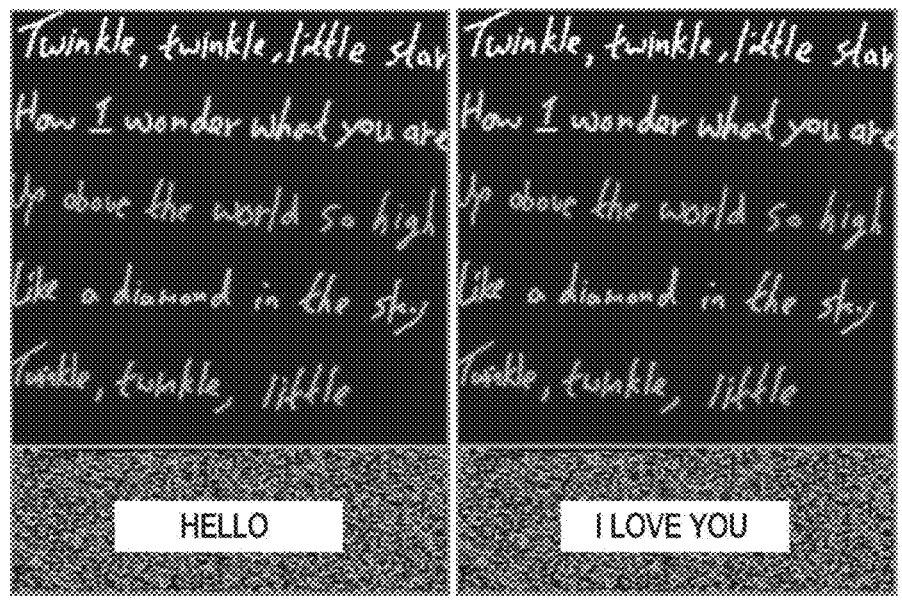
FIG. 14 illustrates user signatures displayed in an encoding area of an animation message according to another embodiment of the present invention.
Figure 15:
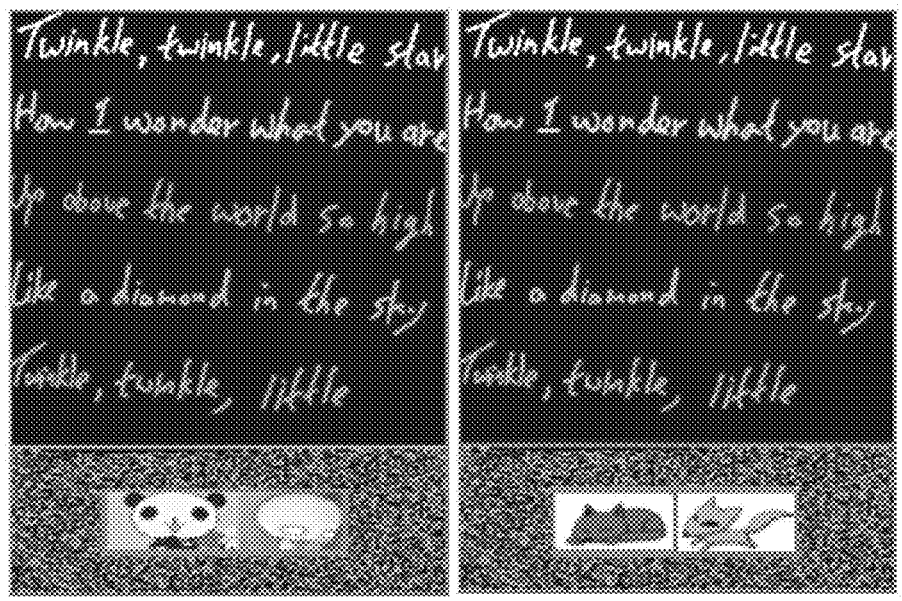
FIG. 15 illustrates previously provided signatures displayed in an encoding area of an animation message according to another embodiment of the present invention.
Figure 16:
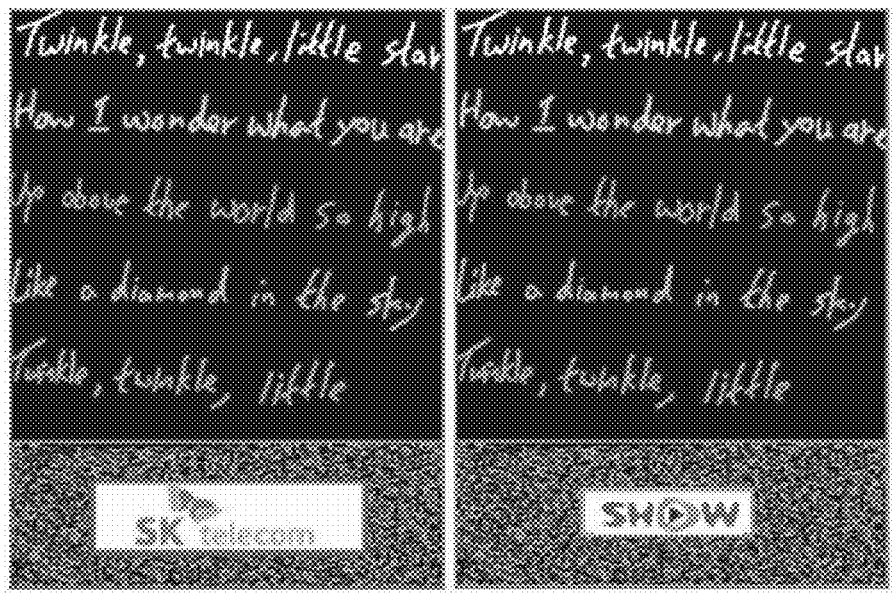
FIG. 16 illustrates communication providers' signatures displayed in an encoding area of an animation message according to another embodiment of the present invention.
Figure 17:
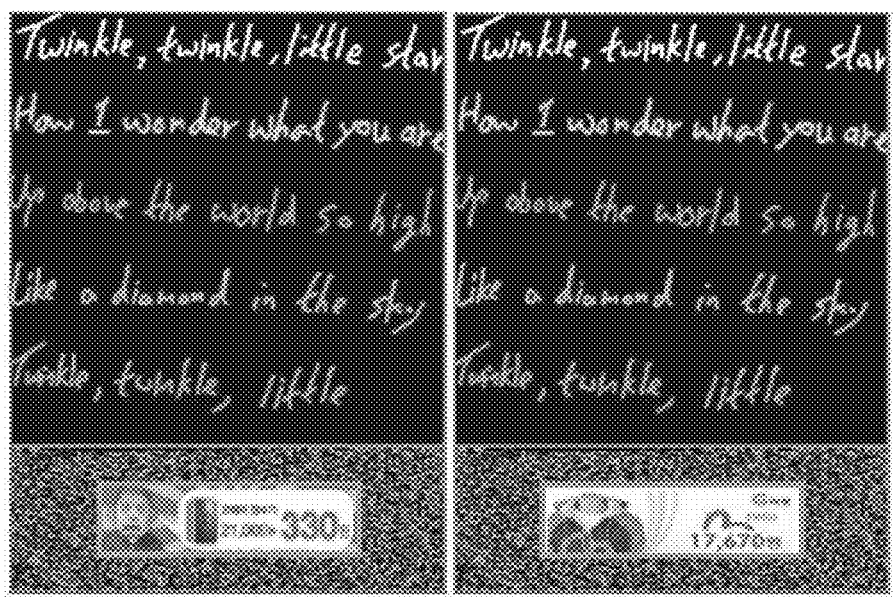
FIG. 17 illustrates signatures for business advertisement displayed in an encoding area of an animation message according to another embodiment of the present invention.

FIG. 14 illustrates user signatures displayed in the encoding area of an animation message according to another embodiment of the present invention, FIG. 15 illustrates previously provided signatures displayed in the encoding area of an animation message according to another embodiment of the present invention, FIG. 16 illustrates communication providers' signatures displayed in the encoding area of an animation message according to another embodiment of the present invention, and FIG. 17 illustrates signatures for business advertisement displayed in the encoding area of an animation message according to another embodiment of the present invention.

To generate user signature, a user can directly generate the content displayed in the signature area as illustrated in FIG. 14. Thus, an apparatus for creating an animation message can provide a tool or means for generating such user signature. For example, a menu for generating a signature may be provided on an animation message sending screen.

Alternatively, for the signature area, one of previously generated signature formats may be selected and displayed as illustrated in FIG. 15. A method of pre-generating several user signatures and automatically selecting a signature set according to a reception terminal (reception number) may also be used. Alternatively, a method of displaying a communication provider's advertisement by a communication provider's server of a transmission/receiving party as illustrated in FIG. 16 or a method of utilizing the signature area by replacing a signature section with a signature for business advertisement may also be used. In another embodiment of the present invention, although a size of the signature area is set as 112×32 as illustrated in FIG. 13, this is only an illustration, and the size of the signature area can be changed according to a message format or a driving environment.

In the encoding area excluding the signature part, input information of the drawing area is encoded by the first image processor 207 of the controller 23. The input information is first converted to at least one code value by the encoder 209, wherein at least one code value is represented as a gray value of each block or pixel of the encoding area. That is, according to an encoding operation of the encoding area, to reduce distortion in JPEG encoding and a communication network, a color tone of each block of the drawing area is divided into K levels using a gray gradation value of the color tone of each block, and a bit value is allocated to each of the divided levels. Thus, a data amount is secured by allocating at least one bit value per pixel or block and by performing encoding. For example, 0-255 gray gradations may be divided into 4 levels, such as 0, 48, 96, and 144, wherein 2 bits are allocated for the levels with bit values 00, 01, 10, and 11. Alternatively, the gray gradation values may be divided into 8 levels, such as 0, 32, 64, 96, 128, 160, 192, and 244, wherein 3 bits are allocated for the levels with bit values 000, 001, 010, 011, 100, 101, 110, and 111.

According to another embodiment of the present invention, the encoding area is divided into 2×1-sized blocks, wherein 2 bits are allocated to each block for dividing the gray gradation values into 4 levels. JPEG encoding has a feature of distorting a neighboring pixel value to a small value as a pixel value is distorted to a large value. Thus, a 2×1-sized block is used instead of a single pixel to obtain an effect of compensating for this distortion by using a mean value of the two pixels. Because a position of the signature area is already known, encoding is performed for an area remaining by excluding the signature area.

The MMS transmitter 211 transmits an animation message including the drawing area and the encoding area to a reception device. The reception device receives the animation message through the MMS receiver 213, and the second image processor 215 of the reception device decodes the encoding area with gray gradation level values corresponding to bit values defined in creation of the animation message according to an opposite manner to an operation of the first image processor 207 of a sending party. According to the present invention, in an animation message service, color image information according to a user input can be reproduced in a reception device even without an animation message viewer by encoding and storing information (point coordinates, strokes, order, color tones, etc.) regarding various pictures and written characters of a user in the encoding area besides the drawing area, and reliability of encoding information can increase by minimizing an influence due to color distortion in JPEG encoding and a communication network. In addition, user hesitation to the additional encoding area can be reduced through user signature or a communication provider's signature.

Figure 18:
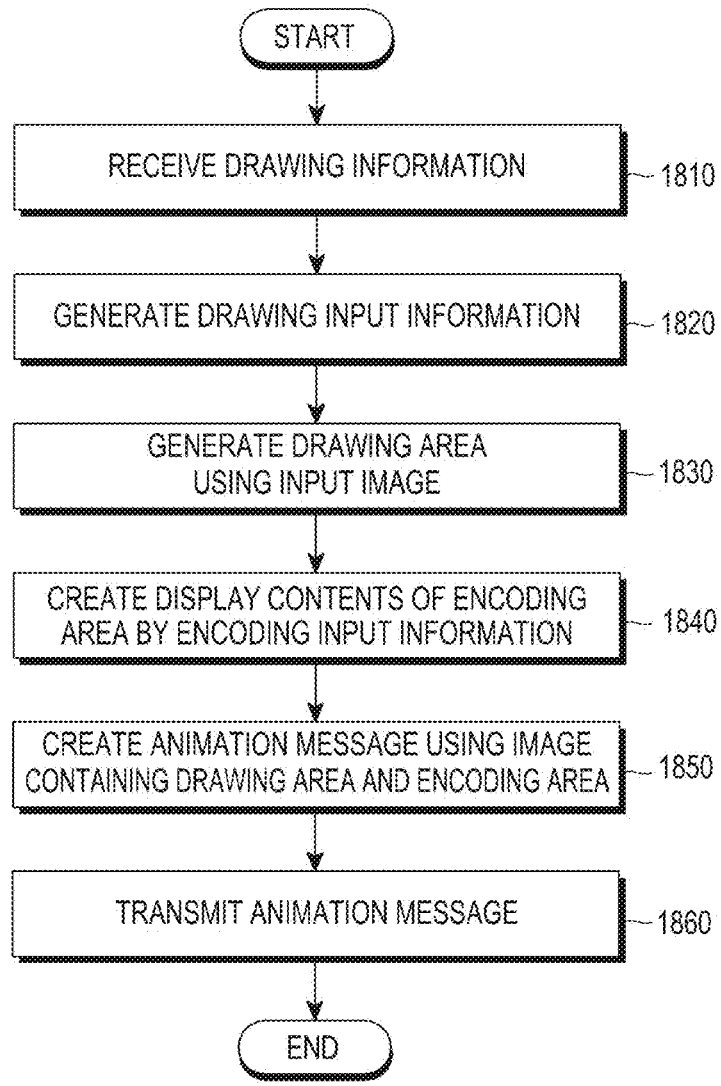
FIG. 18 is a flowchart of an operation of creating an animation message according to another embodiment of the present invention.

FIG. 18 is a flowchart of an operation of creating an animation message according to another embodiment of the present invention.

Referring to FIG. 18, an apparatus for creating an animation message receives drawing information from a user through the touch screen input unit 201 in Step 1810 and generates input information (point coordinates, order, strokes, color tones, etc.) of the drawing information of the user through the touch screen event processor 205. In Step 1830, the first image processor 207 generates a drawing area by using a final input image through a touch input. In Step 1840, the encoder 209 and the first image processor 207 generate the input information as at least one piece of code information and displays a corresponding block of an encoding area with a gray value corresponding to a corresponding bit by allocating a bit pre-set in the encoding area to the generated code information.

In Step 1850, the first image processor 207 creates an animation message by using an image including the drawing area and the encoding area. In Step 1860, the MMS transmitter 211 transmits the created animation message.

Thereafter, a reception operation of a receiving party is a reverse order of a transmission operation of a sending party. That is, the MMS receiver 213 receives the animation message, the second image processor 215 extracts an image of the drawing area, extracts a gray gradation value corresponding to a bit value per block pre-set in the encoding area by extracting the bit value per pre-set block, and extracts code values of the input information by using the gray gradation values. The decoder 217 generates the input information for driving the animation message by using the extracted code values, and the animation message processor 221 reproduces the animation message. If the animation message cannot be reproduced, the attached image processor 219 displays only an image of the drawing area.

For the animation message service, the present invention reduces unnecessary data consumption by using a variable block size according to a data amount to contain additional information (point coordinates, strokes, order, color tones, etc.) of drawing information input in an image having a format such as JPEG and increases concealment performance through pattern switching.

In addition, the concealment performance can increase by using an adaptive mixed level scheme according to a stroke part or a background part, and reliability can be secured according to a high level difference. In addition, unnecessary data consumption can be reduced by not using an error correction scheme in a background area having high reliability.

In addition, data consumption can be minimized and reliability on error correction can increase by using a frequency and space parity scheme in an encoder for setting parity bits, and JPEG loss characteristics can be compensated for by using a mean value of pixels of a bit analysis unit block in a decoder. Accordingly, additional information, such as point coordinates, strokes, order, and color tones, of an input unit can be concealed in an image so that a user cannot perceive the additional information, and an accuracy of an information delivery process can increase, thereby increasing reliability of the animation message service.

According to another embodiment of the present invention, by separately setting an encoding area besides a drawing area to deliver additional information of drawing information in an animation message, even an apparatus not supporting animation message reproduction can reproduce an input image of a sender received by excluding the additional encoding area without concerned with distortion of color information due to JPEG image transmission and reception. In addition, since the encoding area represented with gray color areas may be viewed as broken by a user, user hesitation can be reduced by inserting a user signature or a business advertisement into the additional encoding area.

A configuration and operation of a method and apparatus for creating an animation message according to an embodiment of the present invention can be achieved as described above. While the invention has been shown and described with reference to certain embodiments, it will be understood by those skilled in the art that various changes in form and details may be made therein without departing from the spirit and scope of the invention as defined by the appended claims.

What is claimed is:

1. An apparatus for creating an animation message, the apparatus comprising:
a touch screen for receiving user input for constructing the animation message and outputting an image received from a controller;
the controller for generating input information indicating sequential input times and input coordinates according to an input order of drawing information input through the touch screen, displaying a drawing image of the input drawing information in a drawing area pre-set in the animation message, allocating an encoding area for storing the input information to a part pre-set in the animation message, dividing the encoding area into a plurality of blocks having a pre-set size, creating display content of the encoding area by mapping the input information to the plurality of blocks of the encoding area pre-set in the animation message, and creating the animation message containing the drawing area and the encoding area; and
a wireless transceiver for transmitting and receiving the animation message,
wherein the controller creates the display content of the encoding area by mapping the input information to the plurality of blocks of the encoding area pre-set in the animation message, converts the input information to at least one code value, and maps at least one code value in correspondence with the plurality of blocks of the encoding area, so that a level of a gray value of each block is changed and displayed according to a bit value of a corresponding code value.

2. The apparatus of claim 1, wherein the input information further comprises at least one of an input order of written strokes, attributes of the written strokes, and an input color of the written strokes from among input drawing information.

3. The apparatus of claim 1, wherein the animation message includes a Joint Photographic Experts Group (JPEG) image format.

4. The apparatus of claim 1, wherein the encoding area is located below the drawing area.

5. The apparatus of claim 1, wherein the encoding area contains a pre-set sized signature area for displaying a signature.

6. The apparatus of claim 5, wherein the signature area contains content set by the user, previously provided content, a communication provider's advertisement, or a business advertisement.

7. The apparatus of claim 6, wherein each of width and height of the signature area is set to a multiple of 16, and each of a horizontal axis position and a vertical axis position of coordinates of a starting position of the upper left end of the signature area is set to a multiple of 16.

8. The apparatus of claim 1, wherein the level of the gray value is represented with 4 levels for indicating a 2-bit value or 8 levels for indicating a 3-bit value.

9. The apparatus of claim 1, wherein the controller extracts a drawing image from a drawing area of a received animation message, extracts a bit value mapped according to a gray value of every block of an encoding area of the received animation message, generates input information containing information indicating input times and input coordinates according to an input order of the received animation message according to the bit values, and reproduces the received animation message according to the input information of the received animation message.

10. A method for reproducing an animation message by an electronic device, the method comprising:
receiving user input for constructing the animation message;
generating input information indicating sequential input times and input coordinates according to an input order of drawing information input;
displaying a drawing image of the input drawing information in a drawing area pre-set in the animation message;
allocating an encoding area for storing the input information to a part pre-set in the animation message;
dividing the encoding area into a plurality of blocks having a pre-set size;
creating display content of the encoding area by mapping the input information to the plurality of blocks of the encoding area pre-set in the animation message;
creating the animation message including the drawing area and the encoding area; and
transmitting the animation message,
wherein creating the display content of the encoding area comprises:
creating the display content of the encoding area by mapping the input information to the plurality of blocks of the encoding area pre-set in the animation message;
converting the input information to at least one code value; and
mapping at least one code value in correspondence with the plurality of blocks of the encoding area, so that a level of a gray value of each block is changed and displayed according to a bit value of a corresponding code value.

11. The method of claim 10, wherein the input information further comprises at least one of an input order of written strokes, attributes of the written strokes, and an input color of the written strokes from among input drawing information.

12. The method of claim 10, wherein the animation message includes a Joint Photographic Experts Group (JPEG) image format.

13. The method of claim 10, wherein the encoding area is located below the drawing area.

14. The method of claim 10, wherein the encoding area includes a pre-set sized signature area for displaying a signature.

15. The method of claim 14, wherein the signature area includes content set by a user, previously provided content, a communication provider's advertisement, or a business advertisement.

16. The method of claim 15, wherein each of a width and a height of the signature area is set to a multiple of 16, and each of a horizontal axis position and a vertical axis position of coordinates of a starting position of the upper left end of the signature area is set to a multiple of 16.

17. The method of claim 10, wherein the level of the gray value is represented with 4 levels for indicating a 2-bit value or 8 levels for indicating a 3-bit value.

18. The method of claim 10, further comprising:
extracting a drawing image from a drawing area of a received animation message;
extracting a bit value mapped according to a gray value of every block of an encoding area of the received animation message;
generating input information containing information indicating input times and input coordinates according to an input order of the received animation message according to the bit values; and
reproducing the received animation message according to the input information of the received animation message.

* * * * *